US 7,043,487 B2
May 9, 2006

(12) United States Patent
Krishnamurthy et al.

(10) Patent No.: US 7,043,487 B2
(45) Date of Patent: May 9, 2006

(54) METHOD FOR STORING XML DOCUMENTS IN A RELATIONAL DATABASE SYSTEM WHILE EXPLOITING XML SCHEMA

(75) Inventors: Rajasekar Krishnamurthy, Madison, WI (US); Jayavel Shanmugasundaram, Ithaca, NY (US); Eugene Jon Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 10/331,739

(22) Filed: Dec. 28, 2002

(65) Prior Publication Data

US 2004/0128296 A1 Jul. 1, 2004

(51) Int. Cl.
 *G06F 17/30* (2006.01)
(52) U.S. Cl. ......................... 707/100; 707/10
(58) Field of Classification Search ..................... 707/3, 707/100, 102, 104.1, 10
 See application file for complete search history.

(56) References Cited

U.S. PATENT DOCUMENTS

| | | | |
|---|---|---|---|
| 6,336,137 B1 | 1/2002 | Lee et al. | |
| 6,366,934 B1 | 4/2002 | Chang et al. | |
| 2001/0037460 A1 | 11/2001 | Porcari | |
| 2001/0044811 A1 | 11/2001 | Ballantyne et al. | |
| 2001/0049702 A1 | 12/2001 | Najmi | |
| 2002/0029304 A1 | 3/2002 | Reynar et al. | |
| 2002/0169788 A1* | 11/2002 | Lee et al. | 707/104.1 |

FOREIGN PATENT DOCUMENTS

EP 1 077 405 A2 2/2001

OTHER PUBLICATIONS

P. Bohannon et al., "From XML Schema to Relations: A Cost-Based Approach to XML Storage", IEEE ICDE, 2002.
S. Davidson et al., "Propagating XML Constraints to Relations", IEEE ICDE, 2003.
D. Lee et al., "Constraints-Preserving Transformation from XML Document Type Definition to Relational Schema", International Conference on Conceptual Modeling / the Entity Relationship Approach, 2000.

(Continued)

*Primary Examiner*—Mohammad Ali
*Assistant Examiner*—Sheree Brown
(74) *Attorney, Agent, or Firm*—Marc D. McSwain

(57) ABSTRACT

A method for storing XML documents in a relational database system while exploiting XML Schema information to capture information about types, inheritance, equivalence classes, and integrity constraints in the generated relational schema, enabling efficient querying. The invention simplifies complex XML schema types, translates the simplified XML schema types into relational tables, and then stores relations corresponding to each XML element in relational table rows. The simplification includes grouping all occurrences of a given element together, assembling two or more element types into element groups if the schema indicates that elements of those element types will occur the same number of times, and applying a number of transformation rules to the element groups. The translation includes constructing a type graph from the simplified schema, building an element graph for each global element in the simplified schema from the type graph, and generating relational tables from the element graph.

4 Claims, 7 Drawing Sheets

OTHER PUBLICATIONS

Y. Chen et al., "Constraint Preserving XML Storage in Relations", WebDB, 2002.

PCT, Int'l Publication No.: WO 01/33433 A1, "Method and Apparatus for Establishing and Using an XML Database", May 10, 2001.

PCT, Int'l Publication No.: WO 01/61566 A1, "System and Method for Automatic Loading of an XML Document Defined by a Document Type Definition into a Relational Database Including the Generation of a Relational Schema Therefor", Aug. 23, 2001.

PCT, Int'l Publication No.: WO 01/42881 A2, "System and Method for the Storage, Indexing and Retrieval of XML Documents using Relational Databases", Jun. 14, 2001.

PCT, Int'l Publication No.: WO 01/95155 A2, "Method and Apparatus for Efficient Management of XML Documents". Dec. 13, 2001.

A. Deutsch, M. Fernandez, D. Suciu, "Storing Semi structured Data with STORED", Proceedings of the SIGMOD Conference, Philadelphia, Pennsylvania, May 1999.

D. Florescu, D. Kossman, "Storing and Querying XML Data using an RDBMS", IEEE Data Engineering Bulletin, 22(3), pp. 27 34, 1999.

J. Shanmugasundaram, et. al., "Relational Databases for Querying XML Documents: Limitations and Opportunities", Proceedings of the VLDB Conference, Edinburgh, Scotland, Sep. 1999.

World Wide Web Consortium, "Extensible Markup Language (XML) 1.0 (Second Edition)", W3C Recommendation, Oct. 2000, www.w3c.org/TR/REC_xml.

World Wide Web Consortium XML Schema Parts 0, 1 and 2, W3C Candidate Recommendation, Oct. 2000, www.w3c.org/TR/xmlschema_1,_-2,_-3.

* cited by examiner

FIG. 1

```
<complextype name="sampletype">
    <sequence>
        <choice minOccurs="0" maxOccurs="*">
            <sequence>
                <element name="a" type="atype"/>
                <element name="b" type="btype"/>
                <element name="c" type="ctype"/>
            </sequence>
            <element name="d" type="dtype"/>
        </choice>
        <element name="c" type="ctype" minOccurs="0"/>
        <element name="e" type="etype"/>
        <element name="f" type="ftype" minOccurs="0"/>
        <element name="g" type="gtype"/>
    </sequence>
</complextype>
```

FIG. 2

```
<complextype name="sampletype">
    <sequence>
        <sequence minOccurs="0" maxOccurs="*">
            <element name="a" type="atype"/>
            <element name="b" type="btype"/>
        </sequence>
        <element name="c" type="ctype" minOccurs="0" maxOccurs="*"/>
        <element name="d" type="dtype" minOccurs="0" maxOccurs="*"/>
        <element name="e" type="etype"/>
        <element name="f" type="ftype" minOccurs="0"/>
        <element name="g" type="gtype"/>
    </sequence>
</complextype>
```

```xml
<?xml version="1.0" ?>
<schema targetNamespace="http://www.w3.org/book"
        xmlns="http://www.w3.org/2001/XMLSchema"
        xmlns:book="http://www.w3.org/book">

<element name="book" type="book:booktype"/>
<element name="monograph" type="book:monographtype"/>
<element name="article" type="book:articletype">
        <key name="articleAuthorKey">
                <selector>author</selector>
                <field>name/@authorid</field>
        </key>
</element>

<complextype name="booktype">
        <sequence>
                <element name="booktitle" type="string"/>
                <element name="author" type="book:authortype"/>
        </sequence>
</complextype>

<complextype name="authortype">
        <sequence>
                <element name="name">
                <complextype>
                        <sequence>
                                <element name="firstname" type="string" minOccurs="0"/>
                                <element name="lastname" type="string"/>
                        </sequence>
                        <attribute name="authorid" type="integer"/>
                </complextype>
                </element>
        </sequence>
</complextype>

<complextype name="articletype">
        <sequence>
                <element name="title" type="string"/>
                <element name="author" type="book:authortype" minOccurs="0" maxOccurs="unbounded"/>
        </sequence>
<complextype>

<complextype name="monographtype">
        <sequence>
                <element name="title" type="string"/>
                <element name="author" type="book:authortype"/>
                <element name="editor" type="book:editortype"/>
        </sequence>
</complextype>

<complextype name="editortype">
        <sequence>
                <element name="monograph" type="book:monographtype" minOccurs="0" maxOccurs="unbounded"/>
        </sequence>
        <attribute name="name" type="string"/>
</complextype>
</schema>
```

```
<?xml version='1.0'?>
<schema targetNamespace="http://www.w3.org/emp"
xmlns="http://www.w3.org/2001/XMLSchema"
xmlns:emp="http://www.w3.org/emp">

<element name="emp" type="emp:emptype"/>

<complextype name="emptype">
        <sequence>
                <element name="name" type="string"/>
                <element name="dept" type="string" minOccurs="0"/>
        </sequence>
        <attribute name="empid" type="int" />
        <attribute name="email" type="string" minOccurs="0"/>
</complextype>

<complextype name="parttimeemptype">
        <complexcontent>
                <extension base="emp:emptype>
                        <sequence>
                                <element name="hourlywages" type="float"/>
                                <element name="hours" type="int"/>
                        </sequence>
                </extension>
        </complexcontent>
</complextype>

<complextype name="fulltimeemptype">
        <complexcontent>
                <extension base="emp:emptype>
                        <sequence>
                                <element name="salary" type="float"/>
                        </sequence>
                </extension>
        </complexcontent>
</complextype>

<complextype name="mgrtype">
        <complexcontent>
                <extension base="emp:fulltimeemptype">
                        <attribute name="managingdept" type="string"/>
                </extension>
        </complexcontent>
</complextype>
</schema>
```

METHOD FOR STORING XML DOCUMENTS IN A RELATIONAL DATABASE SYSTEM WHILE EXPLOITING XML SCHEMA

FIELD OF THE INVENTION

This invention relates to storing XML documents in a relational database system and more specifically to doing so while exploiting XML Schema.

BACKGROUND OF THE INVENTION

XML has emerged as the dominant standard for data representation and exchange over the Internet. Its nested, self-describing structure provides a simple yet flexible means for applications to model and exchange data. For example, a business can easily model complex structures such as purchase orders in XML form and send them for further processing to its business partners. As another example, all of Shakespeare's plays can be marked up and stored as XML documents so that information such as the beginning of a new section, or the names of the speakers, can be semantically captured as XML tags. In fact, there are already many industry proposals to standardize XML document structures for domains as diverse as electronic commerce and real estate.

With a large amount of data represented as XML documents, it becomes necessary to store and query these XML documents. For example, a business that receives XML purchase orders may need to store these purchase orders, and later query them to see which items need to be shipped.

To address the problem of storing and querying XML documents, there has been some work done on building native XML database systems. These database systems are built from scratch for the specific purpose of storing and querying XML documents. This approach suffers from the potential disadvantage that native XML database systems do not harness the sophisticated storage and query capability already supported in existing relational database systems.

To overcome this limitation, there have been techniques proposed for storing and querying XML documents using relational database management systems (RDBMSs). However, most of them concentrate on storing and query XML document without knowledge of the schema associated with the XML documents. See, for example, A. Deutsch, M. Fernandez, D. Suciu, "Storing Semi-structured Data with STORED", Proceedings of the SIGMOD Conference, Philadelphia, Pa., May 1999 and D. Florescu, D. Kossman, "Storing and Querying XML Data using an RDBMS", IEEE Data Engineering Bulletin, 22(3), pp. 27–34, 1999. There is one known technique that exploits schema information in the form of Document Type Definitions (DTDs), for storing and querying XML documents. See J. Shanmugasundaram, et. al., "Relational Databases for Querying XML Documents: Limitations and Opportunities", Proceedings of the VLDB Conference, Edinburgh, Scotland, September 1999, which is hereby incorporated by reference and referred to hereafter as VLDB99. DTDs specify the structure of XML documents. See World Wide Web Consortium, "Extensible Markup Language (XML) 1.0 (Second Edition)", W3C Recommendation, October 2000, www.w3c.org/TR/REC-xml for more information on DTDs.

These techniques generally work by following a specific set of steps. The first step is relational schema generation, where relational tables are created for the purpose of storing XML documents. The next step is XML document shredding, where XML documents are "stored" by shredding them into rows of the tables that were created in the first step. The final step is XML query processing, where XML queries over the "stored" XML documents are converted into SQL queries over the created tables. The SQL query results are then tagged to produce the desired XML result.

A brief introduction to the XML Schema standard is now provided, and the various issues regarding generating relational schemas are discussed. XML Schema is a World Wide Web Consortium (W3C) recommendation for defining the structure and content of XML documents. See "XML Schema Parts 0, 1 and 2", W3C Candidate Recommendation, October 2000, at www.w3c.org/TR/xmlschema-1, www.w3c.org/TR/xmlschema-2, and www.w3c.org/TR/xmlschema-3 for more information on XML Schema. The XML Schema standard is strictly more expressive than DTDs, and includes several useful features such as typing, inheritance, equivalence classes, and integrity constraints, which are not present in DTDs. Specifically, the main features of the XML Schema specification that distinguish it from DTDs are:

1) XML Schemas are specified in XML syntax.
2) XML Schemas have enhanced data types, as opposed to only character strings supported in DTDs.
3) XML Schemas have support for namespaces.
4) XML Schemas separate the name of an XML element from the name of its type. This is done using the notion of local namespaces. As a result, two distinct XML elements occurring in an XML document can have the same name and different types.
5XML Schemas support inheritance, so new types can be defined by extending or restricting existing types. An instance of a derived type can occur whenever an instance of its ancestor type can appear in an XML document.
6) XML Schemas allow the creation of equivalence classes among elements. Each equivalence class has an exemplar and any element in the class can replace the exemplar in instance XML documents.
7) XML Schemas support identity constraints. These are more powerful than the IDs and IDREFs supported in DTDs. Identity constraints allow constraints to be specified on any element or attribute, regardless of its type. Constraints can be locally scoped and the constraints can be based on a combination of element and attribute content.

There has been some recent work on storing XML in an RDBMS using XML Schema information. In P. Bohannon et al., "From XML Schema to Relations: A Cost-Based Approach to XML Storage", IEEE ICDE, 2002, the authors propose a cost-based approach for creating a relational schema using an XML schema, XML statistics and an XML Query workload. While their approach handles the differentiation between elements and types in XML Schema, it does not handle (i) simplifying complex XML Schema types, (ii) handling recursion in the schema, or (iii) handling inheritance and XML constraints.

In S. Davidson et al., "Propagating XML Constraints to Relations", IEEE ICDE, 2003 (to appear), the authors propose a framework for refining the relational design of XML storage based on XML key propagation. They use the key information while deciding the relational schema, but do not use the DTD or XML Schema information.

There has also been some work on preserving the semantics of the XML data while storing it in an RDBMS. In D. Lee et al., "Constraints-Preserving Transformation from XML Document Type Definition to Relational Schema", International Conference on Conceptual Modeling/the Entity Relationship Approach, 2000, semantic constraints are derived from the DTD and are translated into equivalent relational constraints. In Y. Chen et al., "Constraint Preserving XML Storage in Relations", WebDB, 2002, the authors preserve the semantic information implied by the key/keyref information in the relational schema through the use of constraint relations.

Whatever the precise merits, features, and advantages of the references cited above, none of them achieves or fulfills the purposes of the present invention. A method of storing XML documents in a relational database system by generating relational schemas that exploit the additional features of XML Schema, to answer XML queries efficiently, is therefore needed.

SUMMARY OF THE INVENTION

It is accordingly an object of this invention to provide a new method, system, and program product for generating relational schemas that exploit the additional features of XML Schema to enable a relational database system to answer XML queries efficiently. The invention captures information about types, inheritance, equivalence classes, and integrity constraints in the generated relational schema. The invention simplifies complex XML schema types containing attribute and element specifications, translates the simplified XML schema types into relational tables, and then stores relations corresponding to each XML element in relational table rows.

The simplification includes grouping all occurrences of a given element together, assembling two or more element types into element groups if the XML schema indicates that elements of those element types will occur the same number of times, and applying a number of transformation rules to the element groups. The translation includes constructing a type graph from the simplified XML schema, building an element graph for each global element in the simplified schema from the type graph, and generating relational tables from the element graph. The invention also handles advanced XML Schema features.

The foregoing objects are believed to be satisfied by the embodiment of the present invention as described below.

BRIEF DESCRIPTION OF THE DRAWINGS

FIG. 1 is a diagram of a fragment of an example XML Schema, according to an embodiment of the present invention.

FIG. 2 is a diagram of a simplified version of an XML Schema, according to an embodiment of the present invention.

FIG. 3 is a diagram of an example simplified XML Schema, according to an embodiment of the present invention.

FIG. 7 is a diagram of an example XML Schema with derivation by extension, according to an embodiment of the present invention.

DETAILED DESCRIPTION OF THE INVENTION

Figure 4:
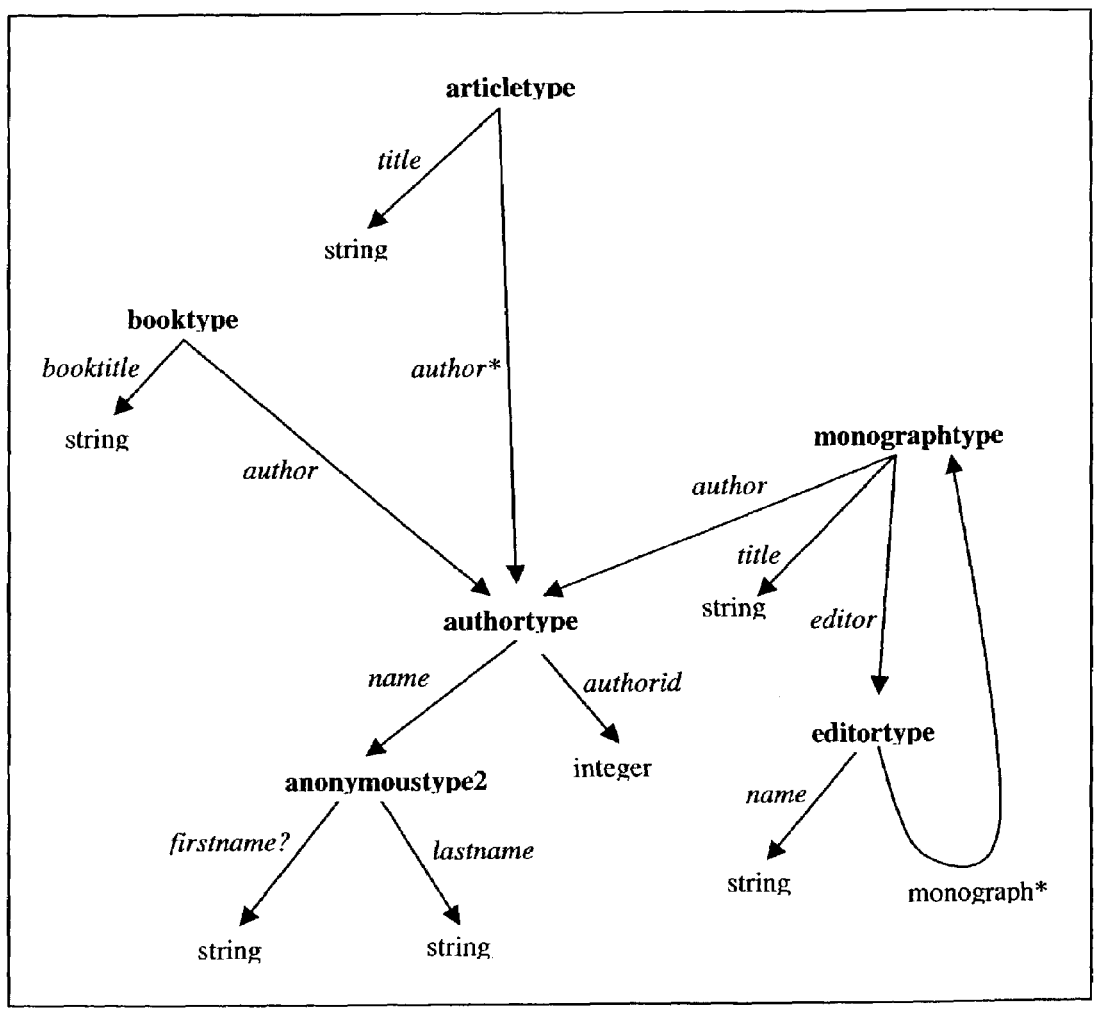
FIG. 4 is a diagram of the type graph for the simplified XML Schema of FIG. 3, according to an embodiment of the present invention.

We first describe the proposed technique for relational schema generation and XML document shredding by considering only the basic XML schema features, which includes the specification of complex, potentially recursive data types. We subsequently generalize this technique to handle other advanced XML Schema features, such as inheritance, equivalence classes, order, integrity constraints, and wild card specifications.

The following method steps describe the high-level algorithm for relational schema generation and XML document shredding considering only the basic XML schema features:

1) Simplify the representation of complex XML Schema types for efficient translation into relations.
2) Process the simplified XML Schema graph and generate a relational schema, handling nested XML elements, recursion, and data types.
3) Shred XML documents into relations based on the relational schema generation used in Step 2.

Each of the steps above are described now in more detail.

Simplifying an XML Schema

XML Schema supports complex XML types. Complex type definitions contain attribute and element specifications. The specification of complex types can be built out of primitive constructs. These constructs specify various strategies of grouping elements, such as "sequence", "choice" and "all".

One of the key observations made in VLDB99 is that complex XML type specifications can be simplified for the purpose of translation to relational schemas. When storing XML documents in a relational database system, all that matters is the relative ordering among the siblings of an element and the parentchild relationship among elements. As a result, complex XML type specifications can be simplified for a more efficient translation into relational schemas. We now present a technique for simplifying complex XML Schema types. We first illustrate the technique by means of an example, and then present the transformation rules for complex element simplification.

Referring now to FIG. 1, a fragment of a diagram of an example XML Schema is shown, according to an embodiment of the present invention. As can be seen, it incorporates the XML Schema grouping constructs "sequence" and "choice". Using regular expression syntax, the example XML Schema can be represented more compactly as (((a, b, c)|d)*, c?, e, f?, g). Our description of the transformation rules for simplifying XML Schemas will work off this compact syntax. The notation "X" (with or without a modifier) refers to an element name, and the type of the element is implicit. For example, in FIG. 1, "a", "b", etc. are all element names, so when we refer to a content model as (a,b,c) we are referring to the elements a, b, and c, and the corresponding types are implicitly associated with them. Thus, "X" without a modifier denotes a single occurrence of an element, while "X*" denotes zero or more occurrences of an element, and "X?" denotes zero or one occurrences of an element.

There are two main ideas underlying the simplification of an XML Schema. Firstly, all occurrences of the same element type are grouped together. This is to ensure that elements of the same type are stored together in the relational schema, which is desirable since fewer joins would then be needed to reconstruct documents. Secondly, two or more element types are grouped together if the XML Schema indicates that elements of those types will occur the same number of times. We refer to these as element groups.

Referring now to FIG. 2, a diagram of a simplified version of an XML Schema is shown, according to an embodiment of the present invention. The original schema (((a, b, c)|d)*, c?, e, f?, g) has been simplified to ((a, b)*, (c)*, (d)*, (e, g), (f)?). As shown, multiple occurrences of the same element have been grouped into a single element. For example, all occurrences of c have been combined into (c)*. Also, elements that occur the same number of times are put into element groups. For example, a and b are put in the element group (a, b)* because a and b occur (together) zero or more times.

Note that the simplification technique presented will generate a different simplified XML Schema than the one described in VLDB99, which did not include the notion of element groups. For example, using the technique presented in VLDB99, the simplified XML Schema for our example would be (a*, b*, c*, d*, e, g, f?). Element types a and b would not be grouped, causing them to be stored separately in the relational schema. As a result, more joins would be required to reconstruct documents than the technique presented here.

We now present a general set of transformations that can be repeatedly applied to an XML Schema to simplify it. The transformations work on elements, lists of elements, element groups, and lists of element groups. Commas are used to separate list items and parenthesis are used to group items. An example of an element list in our notation is "a, b, c", an example of an element group is "(a, b, c)", and an example of a list of element groups is "(a, b), (c, d)". We will use the shorthand "elist" to denote an element list and "egrouplist" to denote a list of element groups. We will illustrate the transformations using the example schema (((a, b, c)|d)*, c?, e, f?, g).

1) The first transformation rule forms the initial element groups, of one element per group.

e$\Rightarrow$(e)

In our example, repeated application of this rule transforms the initial specification to:

((((a), (b), (c))|(d))*, (c)?, (e), (f)?, (g))

2) The next rule collapses element groups that occur together in a sequence.

(elist1), . . . , (elist2)$\Rightarrow$(elist1, elist2), . . .

In our example, repeated application of this rule would transform the specification to:

((((a,b,c))|(d))*, (c)?, (e,g), (f)?)

3) The next rule collapses singleton element groups.

((elist))$\Rightarrow$(elist)

In our example, repeated application of this rule would transform the specification to:

(((a, b, c)|(d))*, (c)?, (e, g), (f)?)

4) The next rule removes all '|' or "choice" constructs.

(elist1)|(elist2)$\Rightarrow$(elist1)?(elist2)?

In our example, repeated application of this rule would transform the specification to:

(((a, b, c)?, (d)?)*, (c)?, (e, g), (f)?)

5) The next set of rules flatten all '*' constructs.

(egrouplist1, (elist)?, egrouplist2)*$\Rightarrow$ (elist1)*, (egrouplist1, egrouplist2)*

(egrouplist1, (elist)*, egrouplist2)*$\Rightarrow$ (elist1)*, (egrouplist1, egrouplist2)*

In our example, repeated applications of this rule would transform the specification to:

((a, b, c)*, (d)*, (c)?, (e, g), (f)?)

6) The next set of rules flatten all '?' constructs.

(e, elist)?$\Rightarrow$ (e)?, (elist)?

((elist)*, egrouplist)?$\Rightarrow$ (elist)*, (egrouplist)?

((elist)?, egrouplist)?$\Rightarrow$ (elist)?, (egrouplist)?

There are no applications of these rules in our example. So the specification is the same.

((a, b, c)*, (d)*, (c)?, (e, g), (f)?)

7) The next set of rules group together all occurrences of the same element.

(egrouplist1, e, egrouplist2), . . . , (egrouplist3, e, egrouplist4)*$\Rightarrow$ (e)*, (egrouplist1, egrouplist2), . . . , (egrouplist3, egrouplist4)*

(egrouplist1, e, egrouplist2)*, . . . , (egrouplist3, e, egrouplist4)$\Rightarrow$ (e)*, (egrouplist1, egrouplist2)*, . . . , (egrouplist3, egrouplist4)*

(egrouplist1, e, egrouplist2)*, . . . , (egrouplist3, e, egrouplist4)*$\Rightarrow$ (e)*, (egrouplist1, egrouplist2)*, . . . , (egrouplist3, egrouplist4)*

(egrouplist1, e, egrouplist2), . . . , (e)?$\Rightarrow$ (e)*, (egrouplist1, egrouplist2), . . .

(e)?, . . . , (egrouplist1, e, egrouplist2)$\Rightarrow$ (e)*(egrouplist1, egrouplist2), . . .

(egrouplist1, e, egrouplist2)*, . . . , (e)?$\Rightarrow$ (e)*, (egrouplist1, egrouplist2)*, . . .

(e)?, . . . , (egrouplist1, e, egrouplist2)*$\Rightarrow$ (e)*, (egrouplist1, egrouplist2)*, . . .

(e)?, . . . , (e)?$\Rightarrow$ (e)?, . . . .

In our example, repeated applications of these rules would produce:

((a, b)*, (c)*, (d)*, (e, g), (f)?)

Repeated application of the above rules can be used to simplify arbitrarily complex XML Schemas.

Relational Schema Generation

Referring now to FIG. 3, a diagram of an example simplified XML Schema is shown, according to an embodiment of the present invention. We now present our technique for generating the relational schema from the simplified XML schema. The first step is to construct what we refer to as the type graph from the simplified XML schema. Next, the type graph is used to construct what we refer to as an element graph for each global element in the simplified XML Schema. Finally, relational tables are generated from the element graph.

Constructing the Type Graph

The type graph is constructed directly from the simplified XML Schema. It captures the type structure of the simplified XML schema and generalizes the DTD graph proposed in VLDB99 in two important respects. Firstly, it incorporates type information (other than strings), which is absent in DTDs and hence in the DTD graph. Secondly, the type graph captures the notion that element names and element types are distinct (which is not true of the DTD graph).

Referring now to FIG. 4, a diagram of the type graph for the simplified XML Schema of FIG. 3 is shown, according to an embodiment of the present invention. The nodes in the graph represent types. The edges have a label and multiplicity associated with them, where the labels are the attribute or element names and multiplicity is one of '?', '*', '+' or ' ' (which denotes exactly once). Note that information about element groups can be captured as relationships between edges, although there are no element groups in our example. Cycles in the type graph indicate the presence of recursion. In our example, the integer and string types are shown as multiple nodes in the graph for clarity—there are just one integer and one string node in the actual type graph. Also, note how anonymous types are given names by the translator.

Constructing the Element Graph

Figure 5:
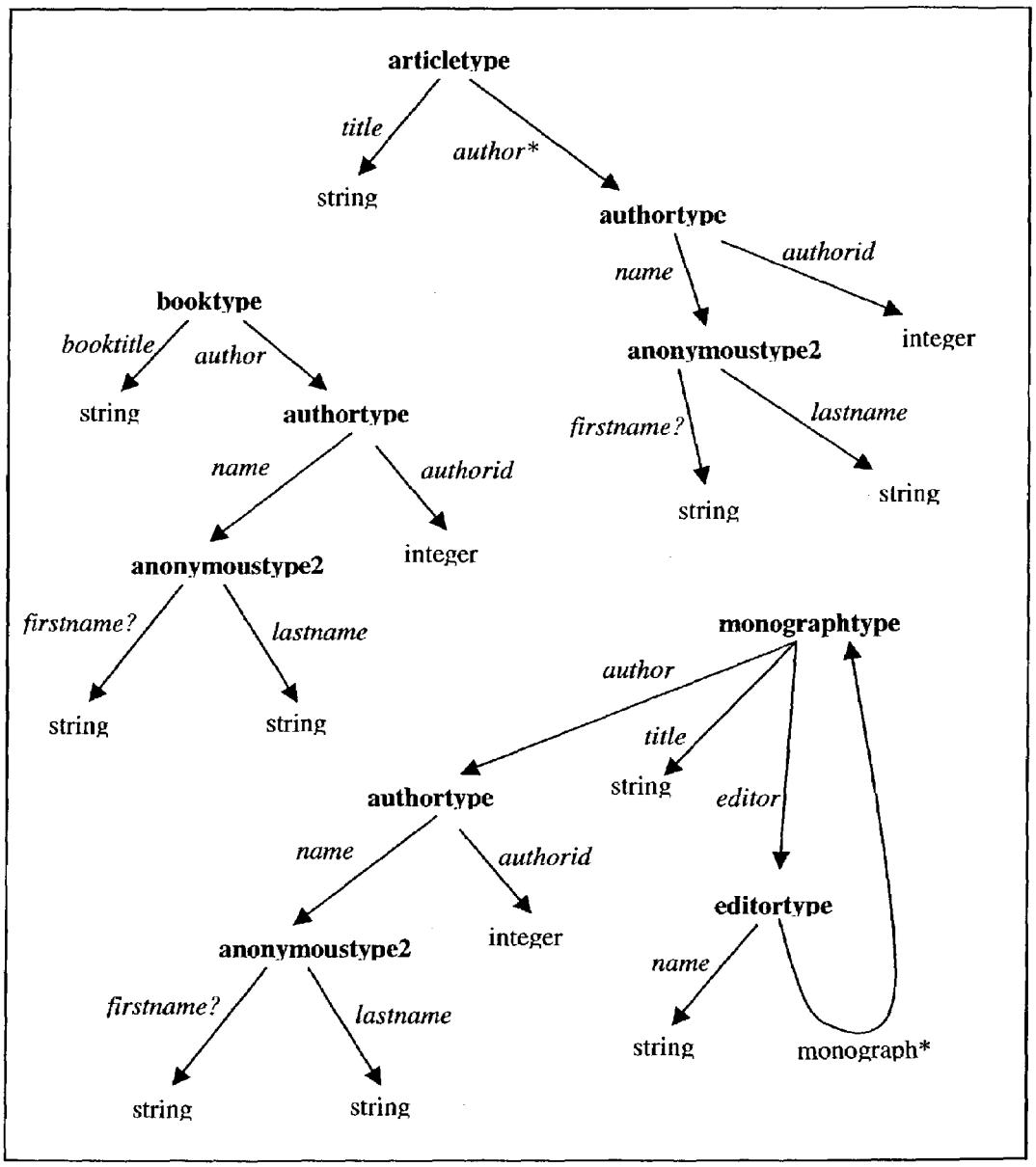
FIG. 5 is a diagram of the element graph for the global elements "book", "monograph", and "article", according to an embodiment of the present invention.

Referring now to FIG. 5, a diagram of the element graph for the global elements "book", "monograph", and "article" is shown, according to an embodiment of the present invention. Using the type graph, an element graph is constructed for each top-level (i.e., global) element in the XML Schema of FIG. 3. An element graph for a global element G is constructed by essentially projecting the portions of the type graph that are reachable from G's type.

The element graph is basically an intermediate step, making it easier to generate the relational schema. It is primarily used to identify complex types with multiple parent types. Such types will appear more than once in the element graph and, depending on the context, may or may not require a separate table to be created in the relational schema. For example, authortype appears more than once in the element graph shown in FIG. 5 since it has more than one parent in the type graph. In this example, authortype elements will ultimately be stored three different ways in the relational schema:

authortype elements with a booktype parent will be in-lined (as columns) in the same table used to store booktype elements authortype elements with a monographtype parent will be in-lined (as columns) in the same table used to store monographtype elements authortype elements with an articletype parent will be stored in a separate table (because there is a "*" edge from articletype to authortype)

Figure 6:
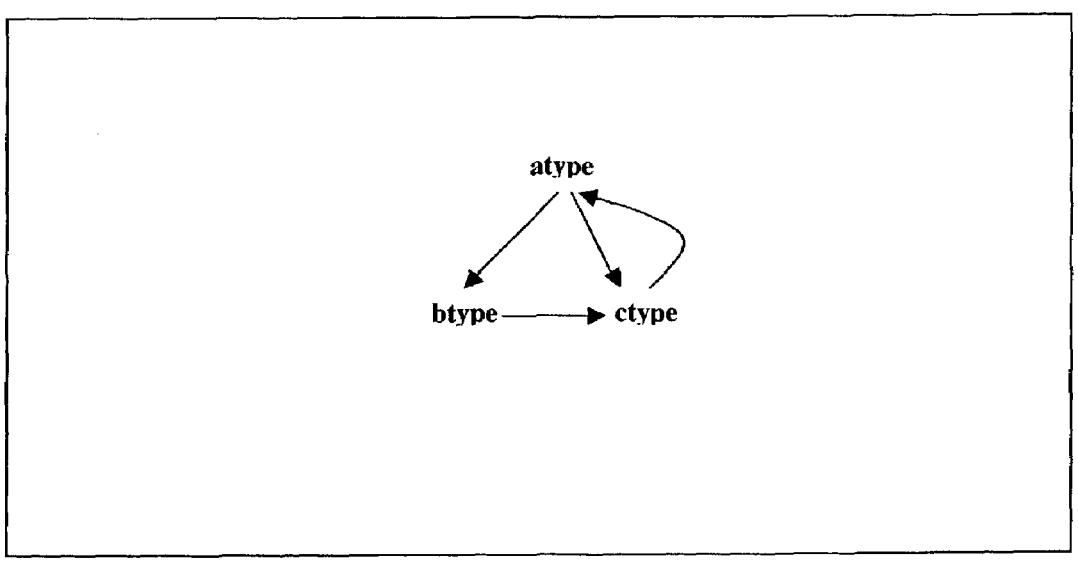
FIG. 6 is a diagram of a cyclic type graph, according to an embodiment of the present invention.

Referring now to FIG. 6, a diagram of a cyclic type graph is shown, according to an embodiment of the present invention. The type graph is traversed in a depth-first manner to generate the element graph. If the type graph has cycles, care must be taken in order to avoid a combinatorial explosion in the number of nodes generated in the element graph. Assume there is a single global element in the XML schema having type atype. Even though ctype has multiple parent types, we do not want to generate a separate ctype node in the element graph for each potential path from the top-level atype node. This is because there are an infinite number of such paths (/atype/ctype, /atype/btype/ctype, /atype/ctype/atype/ctype, . . . )

The combinatorial explosion described above is avoided by identifying strongly connected components in the type graph. As the type graph is traversed to generate the element graph, strongly connected components are used to determine whether a new node needs to be generated for a type T or whether an existing node for T should be shared. With this in mind, the algorithm to traverse the type graph and generate the element graph is as follows. The subscript "t" will be used to denote nodes in the type graph, while the subscript "e" will be used to denote nodes in the element graph (which are being generated).

Method to Generate the Element Graph:
1) Determine the strongly connected components (SCCs) of the type graph and assign each SCC a unique ID (SCCID). Number all nodes in an SCC with its SCCID.
2) For each global element Gt in the type graph, unmark all nodes in the type graph and call the function GenSubGraph(Gt), which is defined below.

GenSubGraph(node Nt): returns a new subgraph rooted at Ne in the element graph corresponding to Nt
1) Mark Nt.
2) If Nt is a simple type then:
   a. Create Ne.
3) If Nt is a complex type then:
   a. Create Ne.
   b. For each attribute of Nt, create an attribute node attached to Ne.
   c. For each subelement St of Nt:
      i. If St is marked (which means a corresponding Se already exists), then add a directed edge from Ne to Se in the element graph.
      ii. Else recursively call GenSubGraph(St) to create Se. Add a directed edge from Ne to Se in the element graph. If the SCCID of St and Nt are the different, unmark all the nodes in the SCC of St that were marked in the recursive call to GenSubGraph(St).
   d. For each subtype of Nt, treat the subtype like a subelement. See step 3b).

The algorithm described above improves on the prior art described in VLDB99 in several respects. Firstly, it improves on the BASIC algorithm described in VLDB99 by avoiding a combinatorial explosion in the number of nodes generated in the element graph when there are cycles in the type graph. To get around this problem, the authors of VLDB99 proposed the SHARED algorithm, which forces a node X with multiple parents in the type graph to always be shared in the element graph. In contrast, the algorithm described above permits X to appear more than once in the element graph, which allows a better relational schema to be generated. For example, if X has two parent types A and B, then elements of type X can be stored in two tables, one for the path /A/X and another for the path /B/X. For queries that access one of these paths, but not both, this will result in better query performance than if all elements of type X were stored in a single table. Finally, unlike the techniques described in VLDB99, the algorithm described can handle the complex types (and subtypes) of XML Schema rather than just simple DTD types.

Generating the Relational Tables

The final step in relational schema generation is to create the relational tables from the element graph. The method to do this is as follows:
1) For each node G in the element graph corresponding to a global element, create a table TG for elements corresponding to G and call the function GenTables(G, TG), which is defined below.
GenTables(node N, table T): generates tables for the subgraph rooted at N
1) For each direct descendent S of N:
   a. If S is a simple type or an attribute, a column corresponding to S is added to T.
   b. If S is a complex type:
      i. If a table TS has already been created for S, then add an additional parent ID column (PID) to TS for linking child rows in TS to their parent in T.
      ii. Else if there is a "*" from N to S, or if S has multiple parents with the same SCCID, or if S has a recursive edge to itself, then a new table TS is created for S. Add an ID column to TS for linking child rows in TS to their parent in T, then recursively call GenTables (S, TS).
      iii. Else recursively call GenTables(S, T)

The relations generated by applying the method to the element graph of FIG. 5 are shown below.

articletype(ID integer, title string)
authortype(ID integer, firstname string, lastname string, authorid integer, articletypePID integer)
booktype(ID integer, booktitle string, firstname string, lastname string, authorid integer)
monographtype(ID integer, firstname string, lastname string, authorid integer, title string, name string, monographtypePID integer)

Note that PIDs are used to relate children with their parents (such as articletypePID to relate an author and article). Also, an ID field has been used to identify each row uniquely.

In our implementation, we use the key constraints in the XML schema as the primary key of the appropriate relations whenever possible. As a result, title is a key for the articletype relation. So, we have a title field in authortype that acts as a pointer to the articletype relation, instead of the articletypePID column. Moreover, since authorid is a key across all authors within an article, (title, authorid) is a key for the authortype relation. Since we have a key for this relation, we do not generate an ID key for this relation. So, the schema in this case looks like:

Articletype(title)
Authortype(title, authorid,firstname,lastname)

XML Document Shredding

Once the relational schema has been generated from an XML Schema, the invention stores the XML document by first walking the XML document, determining the relation that corresponds to each XML element, then storing the content of the corresponding XML element as a row in that relation. Further, if an XML element is stored in a separate relation from its parent, a PID value is added to relate the row.

Advanced XML Schema Features

In the discussion above, we outlined our technique for generating relational schemas from XML schemas, taking into account only the simpler features of XML Schema, such as simple data typing (flexible base types, separation of element names and types) and recursion. We also briefly addressed the issue of sub-typing in the element graph generation algorithm. We now generalize the proposed technique to handle advanced XML Schema features, including sub-typing (in detail), integrity constraints, mixed content, and other features.

Referring now to FIG. 7, a diagram of an example XML Schema with derivation by extension is shown, according to an embodiment of the present invention.

Inheritance

Inheritance is one of the features supported by XML Schema but not supported by DTDs. We now illustrate how a relational schema can be generated for XML Schemas with inheritance. Consider the example XML Schema shown in FIG. 7. In this schema, there is an employee type (emptype) that has two subtypes which are derived by extension, namely part time employees (parttimeemptype) and full time employees (fulltimeemptype). Each of these two types has extra fields corresponding to the type (this is why it is called derivation by extension). The full time employee type in turn has another subtype, which is the manager type (managertype). Again, this is an example of derivation by extension.

The main idea in translating derivation by extension to relational schemas is that subtypes are treated as optional subelements during translation. This means that all the extra fields of a subtype are inlined in the same table as the parent type (if the extra fields can be inlined), with nullable columns representing the optional nature of the subtype's fields. In addition, a subtypecode field is added to specify the specific subtype that occurs in the XML document to be stored. In general, the additional fields may occur more than once or have complex types; in such cases, they will be treated as optional subelements and handled appropriately by the invention. The relational schema generated for our example in FIG. 7: emp(ID integer, empid integer, name string, dept string, email string, hourlywages float, hours int, salary float, managingdept string, subtypecode int)

Note how the employee table has the attributes of all its (direct and indirect) subtypes. Also, the subtypecode field is used to identify the specific type of an instance.

Handling Integrity Constraints

XML Schema has rich support for specifying integrity constraints. It allows the specification of unique, key and keyref constraints, where the constraints can be based on a combination of element and attribute content. The constraints can also be defined within an element. This means that the constraint holds within that element. For example, in FIG. 7, the key constraint within article element author implies that the same author cannot have multiple entries within a single article.

We capture XML key constraints as corresponding relational key constraints in the generated relational schema. XML key constraints that span multiple relations in the relational schema cannot be directly translated to relational key constraints. These constraints will have to be handled using general SQL constraints.

The unique constraint can be handled similar to the key constraint. The keyref constraint can be handled as a foreign key constraint in the relational schema. Again, if the key (foreign key) is represented in more than one relation in the relational schema, then general SQL constraints will have to be used.

We also use the key constraints in the XML Schema to identify candidate keys for a relation. In such scenarios, we may choose to omit the generated ID field and use the existing columns that serve as a candidate key as the primary key for the relation. This in turn allows us to translate keyref conditions into foreign key conditions. Recall that what a foreign key is pointing to should be a primary key in the corresponding relation.

Mixed Content and Wild Card Components

Complex types with mixed content can have text elements interspersed with its element content. So, every time we process such a complex type, we create an additional relation to store the text sub-elements of an element of this type. This relation will have the key columns of the relation containing the complex type as a foreign key, an order field and a value field that represents the text element.

The wildcard components correspond to the <any> and <anyattribute> features of XML Schema. <any> specifies that any well-formed XML can occur in that place. <anyattribute> specifies that any attribute can occur for that complex type. <anyattribute> can be handled using a technique similar to the one described for mixed content. The difference is that the order field is replaced with a name field that gives the name of the attribute. <any> can be handled using techniques proposed for storing schema-less XML documents using a relational database system.

Handling Other Features of XML Schema

Order among siblings in an XML schema specification can be handled using the technique proposed in VLDB99. New simple types can be created in XML Schema by adding constraints to existing types. These can be handled in the relational schema by translating the type constraints into corresponding constraints on the columns in the generated relational schema. For example, if an age simple type is created in XML schema by specifying a range of allowed values on the integer type, then in the generated relational schema, this can be translated into a constraint on the integer column.

The number of occurrences of elements in an XML Schema (specified using minOccurs and maxOccurs) can be translated into SQL constraints on the generated relational schema. The number of occurrences of attributes (exactly once, or optional) can be translated to nullable or non-nullable columns in the generated relational schema. Equivalence classes are handled similar to sub-types, but with an equivalenceCode field instead of a sub-type field.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to illustrative embodiments thereof, it will be understood that various changes may be made in the apparatus and means herein described without departing from the scope and teaching of the invention. Accordingly, the described embodiment is to be considered merely exemplary and the invention is not to be limited except as specified in the attached claims.

We claim:

1. A method for storing XML documents in a relational database system while exploiting XML schema, comprising:
   simplifying complex XML Schema types containing attribute and element specifications;
   translating said simplified XML Schema types into relational tables by
      constructing a type graph directly from said simplified XML schema using non-string type information describing distinct element names and element types;
      building an element graph for each global element in said simplified XML schema from said type graph, including
         traversing said type graph depth-first to identify to strongly connected components (SCCs) in said type graph, to assign each said SCC a unique ID (SCCID), and to number all nodes in each SCC with said SCCID and
         for each global element Gt in said type graph, unmarking all nodes in said type graph and calling a function GenSubGraph(nodeNt) to return a new subgraph rooted at node Ne in said element graph corresponding to node Nt in said type graph;
      generating said relational tables from said element graph; and
   storing relations corresponding to each XML element in relational table rows.

2. The method of claim 1, wherein said function GenSubGraph(node Nt) includes:
   1) marking said node Nt;
   2) if said node Nt is a simple type then creating said node Ne;
   3) else if said node Nt is a complex type then
      a. creating said node Ne;
      b. for each attribute of said node Nt, create an attribute node attached to said node Ne;
      c. for each subelement St of said node Nt
         i. if said subelement St is marked, as a corresponding subelement Se exists, then add a directed edge in said element graph from said node Ne to said subelement Se;
         ii. else recursively call said function GenSubGraph (St) to create said subelement Se, then add a directed edge in said element graph from said node Ne to said subelement Se, then if respective SCCIDs of said subelement St and said node Nt differ then unmark all nodes in the SCC of said subelement St that were marked in said recursive call of function GenSubGraph(St); and
      d. for each subtype of said node Nt, treat said subtype as a new subelement by repeating execution of said function GenSubGraph(Nt) beginning at step 3)b.

3. A method for storing XML documents in a relational database system while exploiting XML schema, comprising:
   simplifying complex XML Schema types containing attribute and element specifications;
   translating said simplified XML Schema types into relational tables by
      constructing a type graph directly from said simplified XML schema using non-string type information describing distinct element names and element types;
      building an element graph for each global element in said simplified XML schema from said type graph;
      generating said realtional tables from said element graph by, for a node G in said element graph corresponding to a global element, creating a table TG for elements corresponding to a said node G and calling a function GenTables(node N, table T) that generates tables for a subgraph rooted at node N; and
   storing relations corresponding to each XML element in relational table rows.

4. The method of claim 3, wherein said function GenTables(node N, table T) includes:
   for each direct descendent S of said node N
      a. if said descendant S is a simple type or is an attribute, then add a column to said table T corresponding to said descendant S; and
      b. else if said descendant S is a complex type then
         i. if a table TS exists for said descendant S then add an additional parent ID column (PID) to said table TS for linking child rows in said table TS to corresponding parents in said table T;
         ii. else if there is a "*" multiplicity from said node N to said descendant S, or if said descendant S has multiple parents with identical SCCIDs, or if said descendant S has a recursive edge to itself, then create a new table TS for said descendant S, then add an ID column to said table TS for linking child rows in said table TS to corresponding parents in said table T then recursively call said function GenTables(S, TS);
         iii. else recursively call said function GenTable(S, T).

* * * * *